United States Patent [19]

Velepec

[11] Patent Number: 5,647,700
[45] Date of Patent: Jul. 15, 1997

[54] DOUBLE BEVEL CUTTING EDGE ROUTER BIT WITH MULTIPLE GUIDE WHEELS

[75] Inventor: Fredric A. Velepec, Glendale, N.Y.

[73] Assignee: Fred M. Velepec Co., Inc., Glendale, N.Y.

[21] Appl. No.: 568,220

[22] Filed: Dec. 6, 1995

[51] Int. Cl.[6] ............................ B26D 1/12; B23C 5/14
[52] U.S. Cl. .................... 407/34; 144/134.1; 144/218; 144/137; 407/42
[58] Field of Search .......................... 407/30, 34, 42, 407/56, 62; 144/134.1, 137, 144.1, 136.95, 154.5, 218, 240

[56] References Cited

U.S. PATENT DOCUMENTS

| | | | |
|---|---|---|---|
| 4,133,361 | 1/1979 | Martinu | 407/34 |
| 4,865,093 | 9/1989 | Forb et al. | 144/240 |
| 4,993,465 | 2/1991 | Cotton et al. | 144/240 |
| 5,063,980 | 11/1991 | Schultz | 144/218 |
| 5,127,774 | 7/1992 | Telford, III | 407/34 |

*Primary Examiner*—W. Donald Bray
*Attorney, Agent, or Firm*—Kenyon & Kenyon

[57] ABSTRACT

A router bit for trimming the overhanging edge of a plastic laminate is provided having a rotatable shaft. A cutting tool is connected to the shaft and a cutting flute or wing is connected to the cutting tool. A ball-bearing guide rides along the apron of a plastic laminated top holding the cutting flute or wing in a spaced relationship to the plastic laminate. The shape of the cutting flute or wing employs two straight edges connected by a small radial section. A first straight edge is provided which lies at an angle of 5° to 7° with a portion of the side edge of the laminate. The second straight edge is provided which lies at an angle of 40° to 60° with a portion of the side edge and the top edge of the plastic laminate. The radial section, connecting the first straight edge to the second straight edge, has a small radius of curvature of 0.005 inches to 0.015 inches.

10 Claims, 4 Drawing Sheets

5,647,700

DOUBLE BEVEL CUTTING EDGE ROUTER BIT WITH MULTIPLE GUIDE WHEELS

FIELD OF INVENTION

This invention relates to improvements in carbide tipped router bits for trimming plastic laminates. The invention also includes a number of different outside-diameter ball-bearing guides for keeping the plastic laminates in a spaced relation to the cutting tool. These different diameter guides allow the invention to be used with a wide variety of laminate thicknesses.

BACKGROUND OF THE INVENTION

Various attempts have been made in the past to provide an edging tool with a guide wheel. In particular, U.S. Pat. No. 4,669,923 to McKinney, issued Jun. 2, 1987, describes a radius cutting edging tool with guide wheel. While this tool may sometimes provide an acceptable end product in terms of laminate edge smoothness, it has a number of disadvantages. For example, because of the large radial section of the McKinney cutting tool, coupled with its nearly flat second section, this cutter cannot be used to properly cut a wide variety of laminate thicknesses.

There is a need for a router bit which can be used on materials of widely varying thicknesses without the necessity of radically alternating the vertical router adjustment during the course of an edging job, this adjustment typically now being required.

SUMMARY OF THE INVENTION

A router bit is provided for trimming the overhanging edge of a plastic laminate which is cemented to a base material. This laminate has a top edge and a side edge. The router bit has a rotatable shaft or shank, a cutting tool connected to the shaft, and at least one cutting flute or wing is connected to the cutting tool. A ball-bearing guide concentric and coaxial with the shaft is used for riding along an apron, which is a vertical side, of the plastic laminate and base, this guide holding the cutting flute or wing in a spaced relationship to the side edge. The ball-bearing guide used on a particular device of the present invention may be any one of a number of different outside diameter sizes, thus allowing the routing of numerous different thicknesses of laminates. Each cutting flute or wing includes a first straight edge, a second straight edge, and a small radial section disposed between the first edge and the second edge. The first straight edge preferably lies at an angle of 5 to 7 degrees with the side edge. The second straight edge preferably lies at an angle of 40 to 60 degrees with the top edge.

DETAILED DESCRIPTION OF THE EMBODIMENTS

Figure 1:
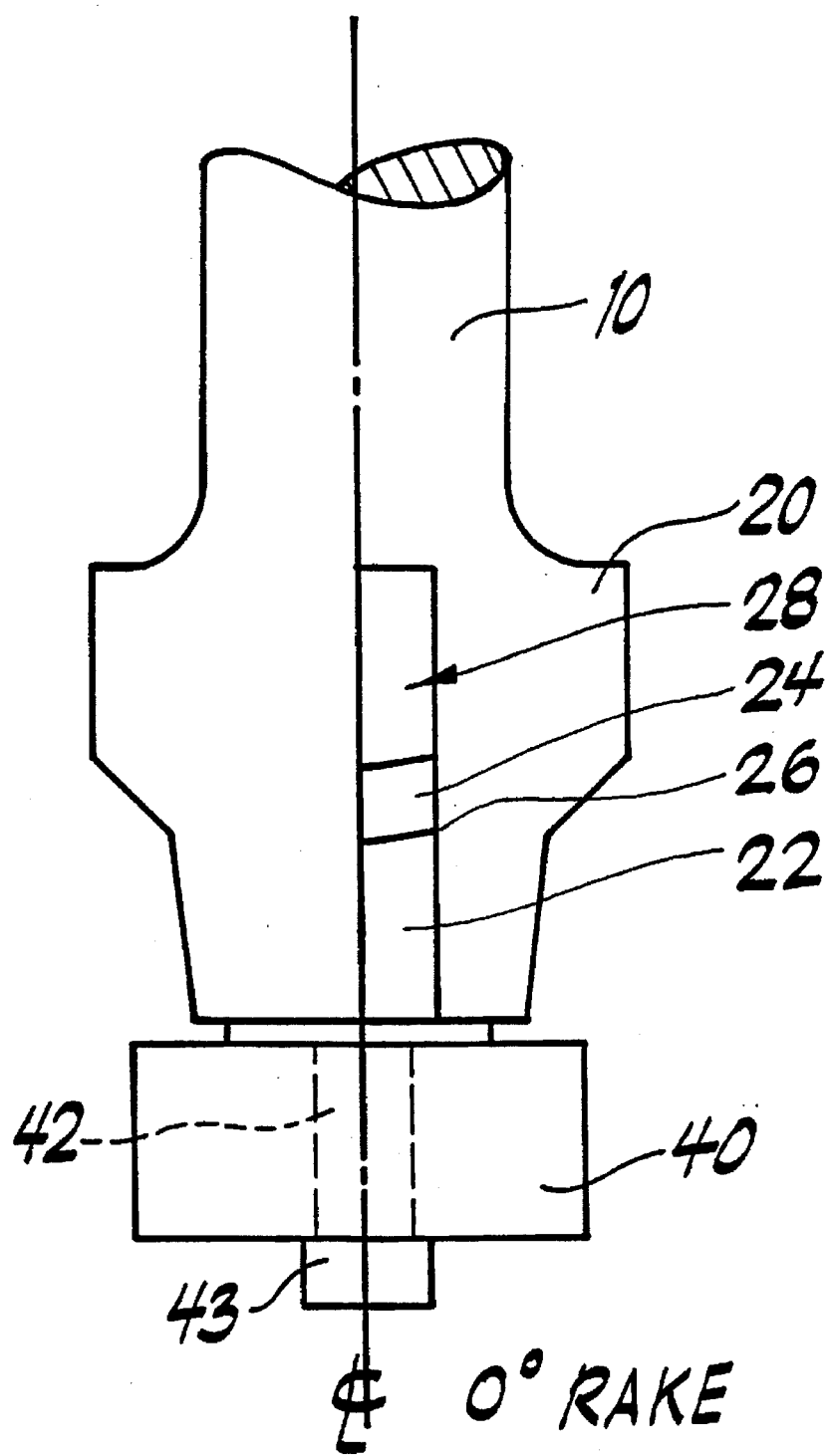
FIG. 1 is a side sectional view of a router bit according to an embodiment of the present invention, where the cutting flute or wing is shown with a zero rake angle.

FIG. 1 shows a cutting tool according to the present invention. In particular, shaft 10 is shown connected to cutting tool 20. Cutting tool 20 is usually made of steel. The active section of cutting tool 20, in terms of that which contacts the work piece, is cutting flute or wing 28. Cutting flute or wing 28 is typically made of tungsten carbide or even a diamond-impregnated material, and may be bonded onto the steel cutting tool 20 with silver solder.

Figure 3:
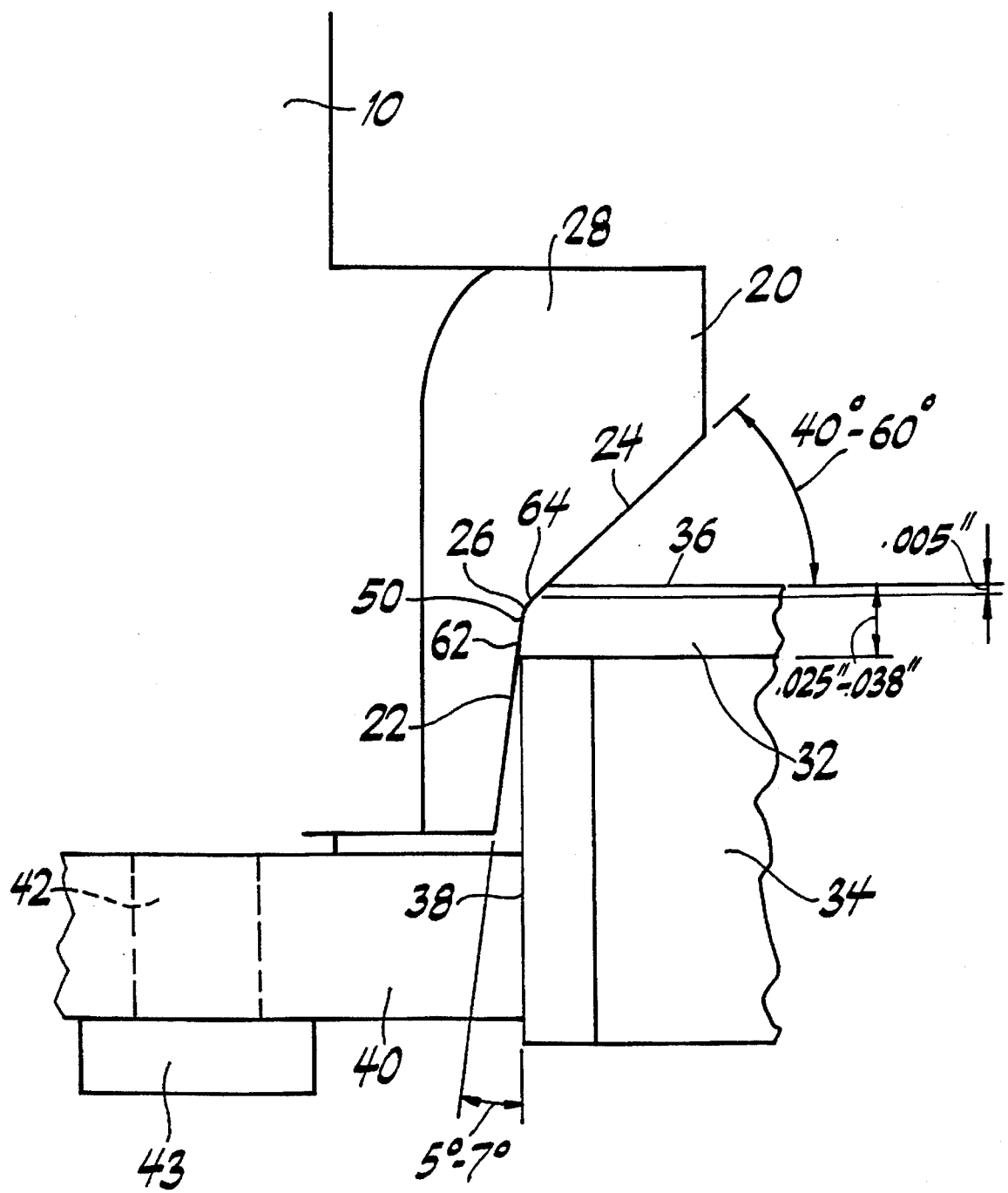
FIG. 3 shows a profile of a cutting edge of a router bit according to an embodiment of the present invention where the cutting flute or wing is shown engaging a laminate with a thickness of 0.025 inches to 0.038 inches.

In FIG. 3, a cutting flute or wing 28 is shown which includes three sections. First section 22 is termed the first straight edge 22 and generally engages part of the side edge of the laminate, this side edge generally being termed side edge 50. Second section 24, termed second straight edge 24, generally engages the balance of the side edge 50 and the top edge 36 of the laminate. Radial section 26 lies between first straight edge 22 and second straight edge 24 and generally engages in a cutting manner the intersection of the lower part 62 of the side edge and the upper part 64 of the side edge. This radial section 26 is preferably quite small with a radius typically less than 0.015 inches.

A guide 40 lies below the cutting tool and is connected to it via guide shaft 42 and cap screw 43. Alternatively, other methods may be used to fasten the guide 40 to the guide shaft 42. For example, a threaded guide shaft may have a nut screwed onto its end. In another embodiment, a snap ring may be fitted onto the end of the guide shaft, holding the guide in place. In yet another embodiment, a screw may be used which is tapped directly into the body of the tool. In any case, guide 40, during operation of the cutting flute or wing, rides along the apron 38 in order to keep the cutting flute or wing in a spaced relationship to the laminate, thereby obtaining the desired results. Guide 40 is preferably a ball-bearing guide. The guide shaft 42 is able to accept different outside-diameter size ball-bearings which thus allows a wide variety of laminate sizes to be properly trimmed.

It should be noted at this point that most plastic laminates have a similar structure. In particular, FIG. 3 shows how a plastic laminate 32 is mounted to a base 34 via some adhesive (not shown), such as cement. The top of the laminate, then, is termed herein as top edge 36. The side of the laminate is termed side edge 50. The thickness of side edge 50 of the laminate and that of the base may be independently varied.

Typically, laminated plastic, sometimes provided under the trademark Formica®, has been glued to the top surface of a material such as plywood, fiberboard, or solid wood. To manufacture a sink top with wood covered by laminate, the apron 38 is laminated with plastic first and then trimmed flush with the top of the plywood, etc. A sheet of the plastic laminate is then glued to the top surface. The laminate is positioned to overhang the apron 38 a small distance, this distance then being routed with a carbide tipped flush trim bit, the flush trim bit usually having a ball-bearing guide which rides along the apron. The diameter of the flush trim bit is slightly smaller than that of the ball-bearing (0.005 inches to 0.010 inches) which allows the top laminate edge to be 0.0025 inches to 0.005 inches overhanging the apron 38. Because the flush trim bit cuts a 90o angle to the top surface, the corner of the laminate is usually very sharp. To avoid injury to the purchaser of the sink or other products manufactured by this procedure, the sharpness is removed or eased by hand filing for small laminate thicknesses, or, if the laminate is thick enough (0.046 inches to 0.052 inches), a radius tool may be used. Fabricators of sink tops or other laminated products do not use the radius tool for trimming mica sheets having a thickness 0.025 inches to 0.038 inches because it leaves a sharp edge. This thin laminate is known in the industry as vertical general purpose post form laminates. With thin materials such as laminates having a thickness of 0.025 inches, the radius bit leave a sharp edge which must still be hand-filed.

Using the present invention, the router machine, which holds the router bit and has a router platform which rests on the top surface of the material, is set so that the overhanging plastic laminate is trimmed at a slight bevel (5° to 7°), starting at the point of contact of the laminate and base and proceeding towards the color-treated top edge of the laminate. At a point 0.005 inches to 0.010 inches from the top of the laminate, the slight bevel becomes an acute bevel of between 40° and 60° to the perpendicular. These bevels expose only the minimum of the core.

The invention thus produces uniform craftsman-quality filing techniques and uniform angles on the laminate. For example, a hand filer would first file angles of 5° to 7° but these angles would create a sharp 95° to 97° angle of the material. The hand filer would then file a secondary angle of 40° to 60°, thus removing the sharp edge. The present invention produces a similar result.

The cutting flute or wing is typically made of tungsten carbide. This carbide flute or wing must be ground by a diamond impregnated grinding wheel and, as a result of grinding this very hard metal, the wheel develops a slight radius on its edge of between 0.005 inches to 0.015 inches. This radius on the grinding wheel produces a small circular arc between the first straight edge and the second straight edge. That is, at the intersection of the cutting edges, a slight circular radius of 0.005 inches to 0.015 inches appears.

By using various size outside-diameter ball-bearing guides, the present invention may be used for trimming, for example, both 0.025 inch to 0.038 inch thick vertical general purpose post form laminates and 0.042 inch to 0.052 inch thick horizontal general purpose standard grade laminates. Such a capability is unknown in the present state of the art.

As examples, there are various thicknesses of laminates such as 0.025 inches, 0.036 inches, 0.042 inches, 0.046 inches, 0.048 inches, 0.050 inches, and 0.052 inches. A ball-bearing of 0.375 inches in diameter may be used for 0.025 inch thickness laminate. Alternatively, a ball-bearing guide of 0.368 inches diameter may be used for 0.052 inches thickness laminate. The former will leave a 7° bevel of 0.005 inches long and the latter will leave 7° bevel of 0.032 inches long. The balance of the top laminate will then be cut with the slight radius and the second bevel.

Figure 4:
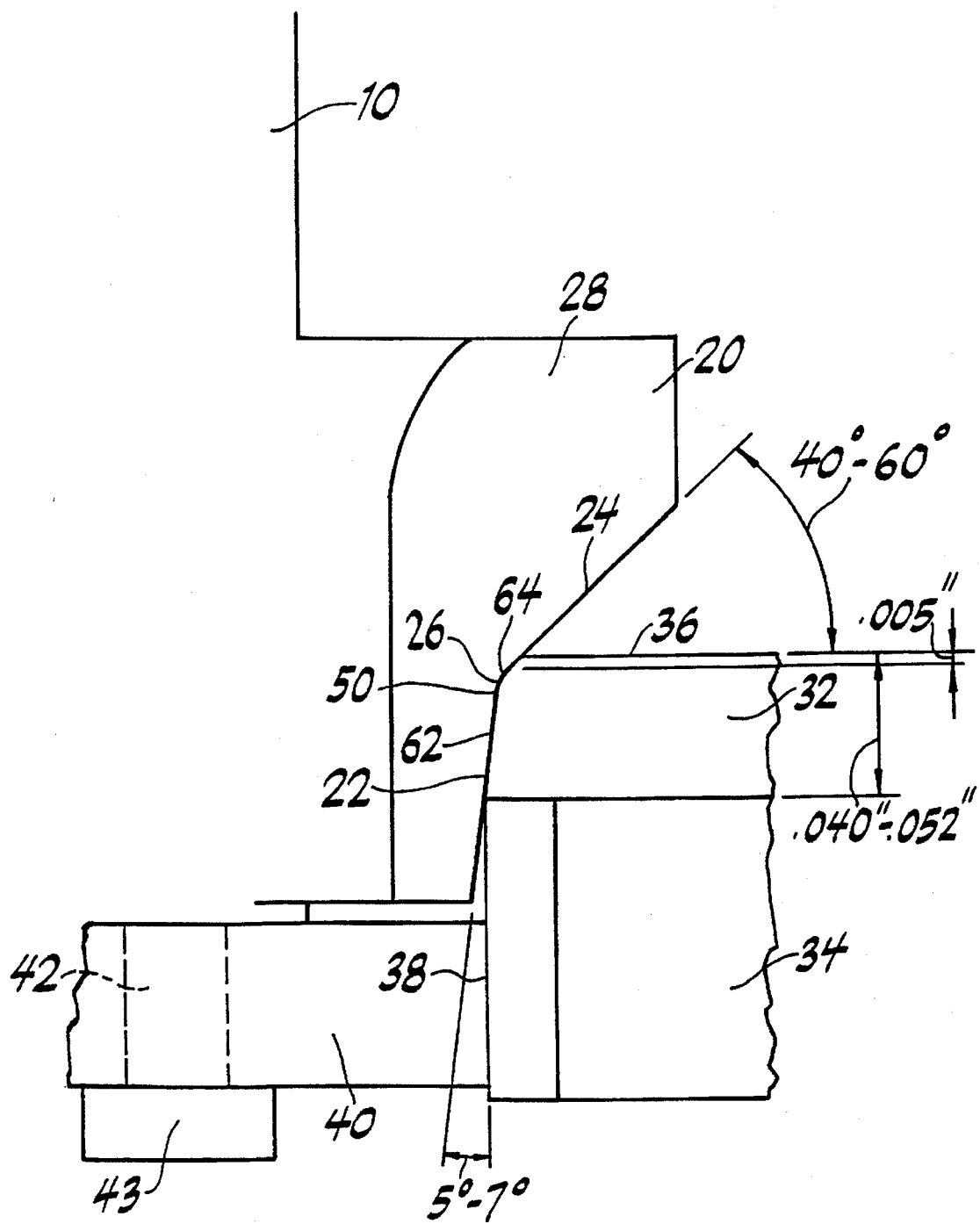
FIG. 4 shows a profile of a cutting edge of a router bit according to an embodiment of the present invention where the cutting flute or wing is shown engaging a laminate with a thickness of 0.040 inches to 0.052 inches, this router bit is identical to FIG. 3 except for having a different diameter ball-bearing guide in order to accommodate the different laminate thickness.

An example of the former situation is shown in FIG. 3, and an example of the latter situation is shown in FIG. 4.

Figure 2:
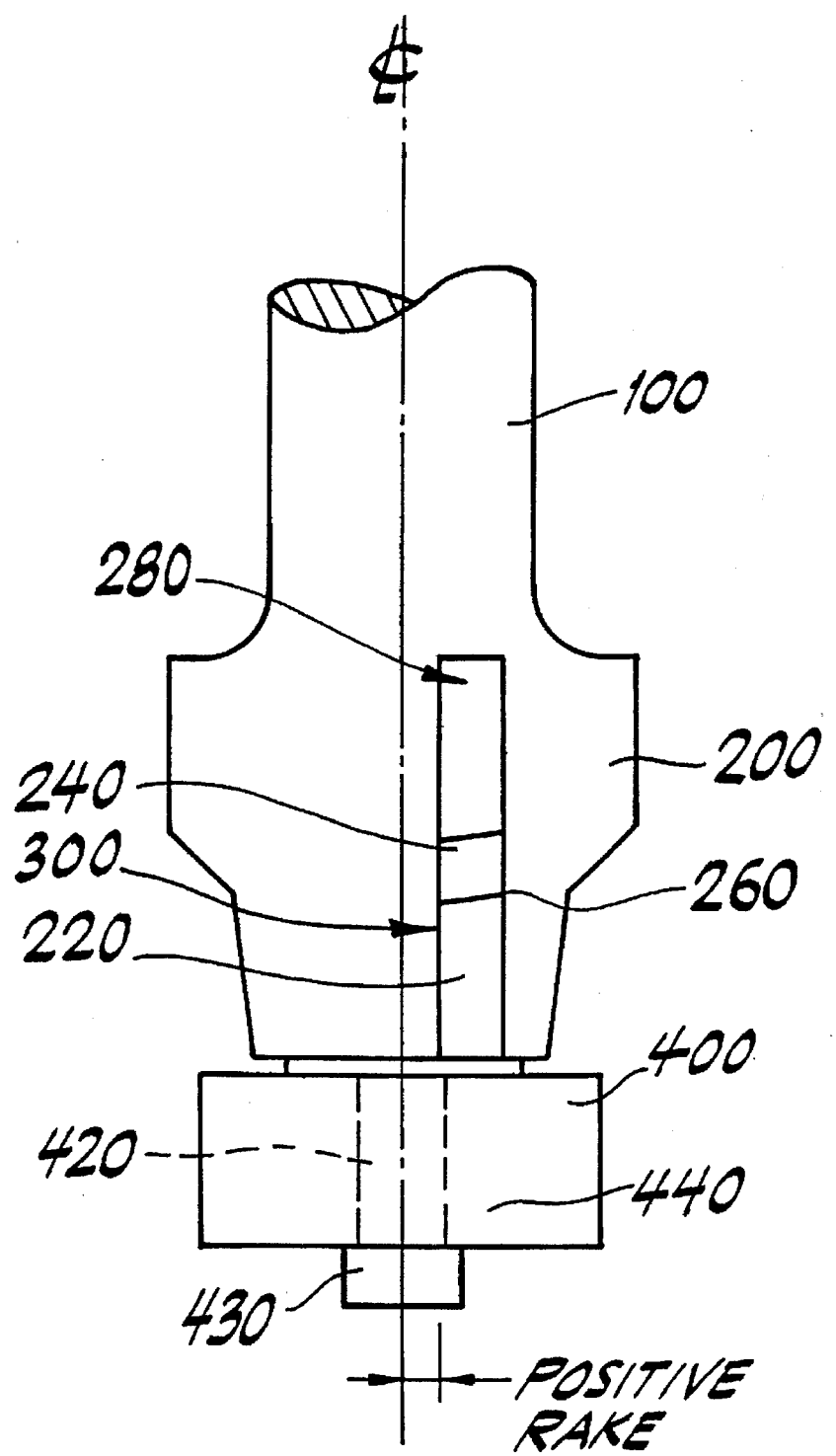
FIG. 2 shows a side section of a router bit according to an embodiment of the present invention where the cutting flute or wing is shown with a positive rake angle.

FIG. 2 shows an embodiment of a router bit according to the present invention where the cutting flute has a positive rake angle. In particular, cutting tool 200 is shown connected to guide 400 via guide shaft 420. Guide shaft 420 has connected to it ball bearing 440 for maintaining the router bit in a spaced relationship to the workpiece.

Cutting tool 200 has connected to it at least one cutting flute 280, and preferably two are provided, each made of a hard material such as tungsten carbide. Each cutting flute has a first edge 220, a second edge 240, and a radial section 260.

As FIG. 2 shows, the face 300 of cutting flute 280 is not along the center line of the router bit, as the same is in FIG. 1. In fact, the face is offset to the right a small distance, such as 1/16". The cutting flute on the opposite side of the bit would be similarly offset. Nevertheless, in relation to FIG. 2, the cutting face is perpendicular to the plane of the drawing. As such, a line drawn along the cutting face would no longer pass through the axial center of the bit, as it would have done in FIG. 1.

The configuration shown, with the cutting face offset to the right, is termed a positive rake angle. A negative rake angle is also possible, in which case the cutting face would be offset to the left of the center line.

Such positive and negative rake angles are beneficial in the routing of certain materials, as the cutting face tends to strike the laminate's top and side edge at a different point than the embodiment of FIG. 1 would have. In this connection, the router bit of the present invention may be used for not only materials of different thicknesses, but also for materials of different hardnesses.

It should be understood, however, that the above description is only with respect to certain embodiments. A number of variations of the above may be made, and certain changes in parts and embodiments may be made within the scope of the invention as defined by the appended claims. For example, a number of different cutting flute or wing shapes may be employed within the ranges given. The number of cutting flutes or wings on the cutting tool may be varied. Other changes would be apparent to one skilled in the art.

What is claimed:

1. A router bit for trimming the overhanging edge of a plastic laminate which is cemented to a base material, this combination having an apron and a top, and said laminate having a top edge and a side edge, comprising:

a rotatable shaft;

a cutting tool connected to said shaft;

at least one cutting flute connected to said cutting tool;

a ball bearing guide concentric and coaxial with said shaft for riding along said apron of said plastic laminated top and holding said at least one cutting flute in spaced relation to said apron; and said at least one cutting flute including:

a first straight edge for engaging generally a portion of the side edge of the laminate;

a second straight edge for engaging generally a portion of the side edge and the top edge of the laminate; and a radial section disposed between said first edge and said second edge for generally engaging the intersection of the lower part of the side edge and the upper part of the side edge.

2. The router bit of claim 1, wherein said first straight edge lies at an angle of five to seven degrees with said side edge.

3. The router bit of claim 1, wherein said second straight edge lies at an angle of forty to sixty degrees with said top edge.

4. The router bit of claim 1, wherein said radial section has a radius of curvature of 0.005" to 0.015".

5. The router bit of claim 1, wherein said cutting flute has a zero rake angle.

6. The router bit of claim 1, wherein said at least one cutting flute emerges from said cutting tool along a line passing through the axial center of the router bit.

7. The router bit of claim 1, wherein said at least one cutting flute emerges from said cutting tool along a line not passing through the axial center of the router bit.

8. The router bit of claim 1, having two cutting flutes.

9. The router bit of claim 7, wherein said cutting flute has a positive rake angle.

10. The router bit of claim 7, wherein said cutting flute has a negative rake angle.

* * * * *